Aug. 11, 1931.      L. E. WIRTH      1,818,444
COTTON PICKING NEEDLE
Filed Dec. 16, 1929
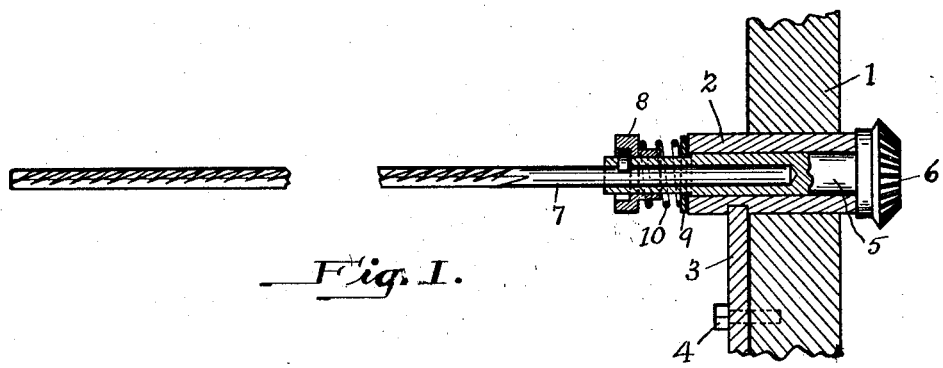
Fig. I.
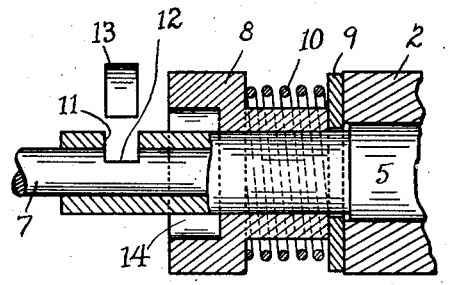
Fig. II.
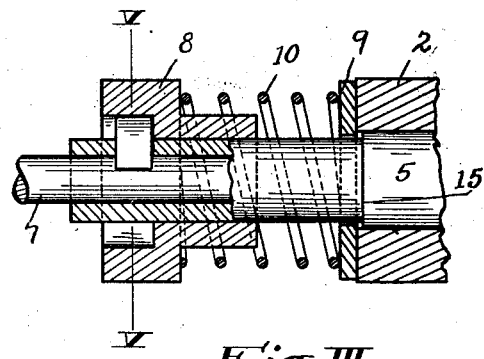
Fig. III.
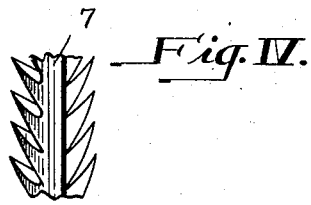
Fig. IV.
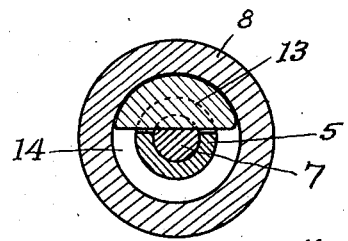
Fig. V.
INVENTOR.
Louis E. Wirth
by Christy Christy and Wharton
his attorneys.

Patented Aug. 11, 1931

1,818,444

UNITED STATES PATENT OFFICE

LOUIS E. WIRTH, OF PITTSBURGH, PENNSYLVANIA, ASSIGNOR TO COTTON HARVESTER CORPORATION OF AMERICA, A CORPORATION OF DELAWARE

COTTON PICKING NEEDLE

Application filed December 16, 1929. Serial No. 414,500.

My invention relates to cotton harvesting machines, and more particularly, to the cotton picking needles which are of importance in their association with such machines. In my co-pending application for Letters Patent, Ser. No. 414,501, filed Dec. 16, 1929, I have described, generally, cotton harvesting machines which comprise two revolving hollow cylinders supported on a carriage to move astride a row of cotton plants to harvest the cotton grown thereon. In that application, I have explained how picking needles are trunnioned in these revolving cylinders to project therefrom in bristle-like arrangement, and have disclosed an organization of mechanical elements within the cylinders to rotate the needles about their own axis. In the walls of each cylinder there are fixed vertical rows of bearings, and the rows are disposed in spaced relation around the entire circumference of the cylinder. Within each of said bearings there is provided a shaft, and on the inner end of the shaft (the inner end projects into the hollow space within a cylinder) is affixed a bevel gear to mesh with a gear of the driving instrumentalities which are organized as mentioned above. Fixed to project outwardly from the outer hollow end of each shaft is a picking needle. It is desirable that the picking needles may be readily removed from or locked in position within these shafts, and that the shafts be readily positioned to stay in the bearings. To provide means to obtain these desiderata is the object of my invention.

In the accompanying drawings Fig. I is a view partially in longitudinal cross-section and partially in side elevation, showing fragmentarily a portion of a cylinder wall and a bearing, shaft, and needle mounted therein; Fig. II is a similar cross-sectional view, on larger scale, showing in open position the device to lock a picking needle within a shaft, and showing a fragment of a shaft partially in cross-section and partially in side elevation; Fig. III is a similar view showing the locking device in closed or locked position on the stem of a picking needle; Fig. IV shows in elevation and in cross-section a fragment of the serrated or barbed portion of a picking needle, and Fig. V is a sectional view through the locking device taken on the plane V—V of Fig. III.

As mentioned above, and referring to the drawings, within the wall 1 of a cylinder bearings 2 are fixed. A key-plate 3, which is retained by a screw 4 on the outer surface of the cylinder, conveniently serves to secure the bearing in the wall. Within the bearing a shaft 5 revolubly fits, there being integral therewith, on its inner end, a bevel-gear 6 to mesh with the instrumentalities to rotate it. Outwardly, the shaft is of hollow formation to receive a picking needle 7, and associated with this outer end I provide means to lock the needle in its illustrated position. It is with these means that my invention has particularly to do.

Slidable on the shaft is a locking member 8 and a washer 9. A spring 10 tends to maintain the member 8 and the washer in separated relation. Adjacent the outer end of the shaft is a notch 11, and in the stem of the needle a similar notch 12 is cut. In assembling, the locking member 8 is pressed into the position illustrated in Fig. II, and the notches 11 and 12 of the needle and shaft are brought into register. An arcuate key 13 is then fitted into the registering notches, and the parts are permitted to assume the position shown in Figs. I and III. The locking member is provided with an annular recess 14, and when the key is properly fitted, the locking member is released to the forces of the spring 10, which move it to the position shown in Fig. III. It will now be obvious that relative movement between the needle and the shaft is positively prevented. The operation of removing or inserting a needle is thus very simple. Threaded parts are dispensed with in my device,—a desirable obviation.

A further cooperation of the locking device should be noted. As in the assembled position shown in Fig. I, the spring 10 tends to force the locking member outwardly, it, with an equal force, bears against the washer 9, and thus effectively bears against the outer end of the bearing 2 to retain the gear 6 against the inner end of the bearing. The locking device, therefore, additionally serves to maintain the shaft within the bearing in the proper lateral position. A shoulder 15 is provided on the shaft to serve as a stop for the washer 9 when the shaft is removed from the bearing. This latter feature simply permits the locking device to be retained compactly on the shaft for shipment or storage.

What I claim is:

1. A picking needle assembly for a cotton harvesting machine comprising a shaft, a needle arranged to extend into said shaft, a member for mutually engaging said shaft and said needle, a movable member slidable on the shaft for locking said engaging member in position to interconnect the needle and the shaft, and means for maintaining the locking member in locking position.

2. A picking needle assembly for a cotton harvesting machine comprising a shaft, a needle arranged to extend into said shaft, a member for mutually engaging said shaft and said needle, a movable member for locking said engaging member in position to interconnect the needle and the shaft, and yielding means arranged to maintain said locking member in locking position.

3. A picking needle assembly for a cotton harvesting machine comprising a shaft, a needle arranged to extend into said shaft, notches in said shaft and in said needle arranged to be brought into register, a key arranged to enter both of said notches to mutually engage the needle and the shaft, a member slidably mounted on the shaft for locking said key in position in said notches, and means for maintaining the locking member in locking position.

4. A picking needle assembly for a cotton harvesting machine comprising a shaft, a needle arranged to extend into said shaft, notches in said shaft and in said needle arranged to be brought into register, a key arranged to enter both of said notches to mutually engage the needle and the shaft, a member movably mounted on the shaft for locking said key in position in said notches, and yielding means arranged to maintain said locking member in locking position.

5. A picking needle assembly for a cotton harvesting machine comprising a shaft, a needle arranged to extend into said shaft, a member for mutually engaging said shaft and said needle, a movable member for locking said engaging member in position to interconnect the needle and the shaft, a stop member on said shaft arranged to contact an abutment lying between said stop member and said locking member, and yielding means arranged to exert a force tending to maintain said locking member in locking position and tending to force the stop member on the shaft into contact with the abutment.

In testimony whereof I have hereunto set my hand.

LOUIS E. WIRTH.